United States Patent
Barned et al.

(10) Patent No.: US 11,247,424 B1
(45) Date of Patent: Feb. 15, 2022

(54) METHODS FOR RETREADING TIRES

(71) Applicant: BRIDGESTONE AMERICAS TIRE OPERATIONS, LLC, Nashville, TN (US)

(72) Inventors: Robert G. Barned, Akron, OH (US); Amy M. Randall, Akron, OH (US); Natalie V. Weingart, Canton, OH (US); Mindaugas Rackaitis, Massillon, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 541 days.

(21) Appl. No.: 15/840,513

(22) Filed: Dec. 13, 2017

Related U.S. Application Data (60) Provisional application No. 62/433,483, filed on Dec. 13, 2016.

(51) Int. Cl.
  *B29D 30/54* (2006.01)
  *B60C 1/00* (2006.01)
  (Continued)

(52) U.S. Cl.
  CPC ....... *B29D 30/542* (2013.01); *B29D 30/0601* (2013.01); *B60C 1/0016* (2013.01);
  (Continued)

(58) Field of Classification Search
  CPC ............................................... B29D 2030/544
  See application file for complete search history.

(56) References Cited

U.S. PATENT DOCUMENTS 2,993,821 A * 7/1961 Gunberg ................ C08L 21/00
  428/495
3,136,673 A * 6/1964 Carver ................... B29D 30/56
  156/96
(Continued)

FOREIGN PATENT DOCUMENTS

CN   1460591 A   12/2003
CN   101781532 B   7/2012
(Continued)

OTHER PUBLICATIONS

Rodgers, B., Waddell, W.H. and Klingensmith, W. 2004. Rubber Compounding. Encyclopedia Of Polymer Science and Technology. Published Online: Jul. 15, 2004 (Year: 2004).*

(Continued)

*Primary Examiner* — Robert C Dye
*Assistant Examiner* — Alexander D Booth
(74) *Attorney, Agent, or Firm* — Meredith E. Hooker; Arthur M. Reginelli (57) ABSTRACT

A process for retreading a tire, the process comprising the steps of providing a tire casing; providing a cured rubber component having first and second planar surfaces, where the first planar surface includes a tread pattern; providing a cushion gum, wherein the cushion gum is a composition including a functional polymer including at least one functional group, and a crosslinking agent including at least two moieties that will react with the functional group of the functional elastomer; applying the cushion gum to the tire casing; applying the second planar surface of the cured rubber to the cushion gum to form a tire composite; and treating the tire composite to thereby form a retread tire.

11 Claims, 3 Drawing Sheets

(51) Int. Cl.
    *B29D 30/06*      (2006.01)
    *C08K 5/548*      (2006.01)
    *C08K 3/36*       (2006.01)
(52) U.S. Cl.
    CPC .............. *C08K 3/36* (2013.01); *C08K 5/548* (2013.01); *B29D 2030/541* (2013.01); *B29D 2030/544* (2013.01)

(56) References Cited

U.S. PATENT DOCUMENTS

| | | | |
|---|---|---|---|
| 3,198,680 | A | 8/1965 | Iknayan |
| 3,840,506 | A | 10/1974 | Collette et al. |
| 3,925,129 | A | 12/1975 | Blankenship et al. |
| 3,931,106 | A | 1/1976 | Crosby et al. |
| 4,175,991 | A | 11/1979 | Harrelson, Jr. |
| 4,204,046 | A | 5/1980 | Minatono et al. |
| 4,434,832 | A | 3/1984 | Koch et al. |
| 4,435,456 | A | 3/1984 | Hausch |
| 4,618,519 | A | 10/1986 | Koch et al. |
| 4,634,488 | A | 1/1987 | Tournier |
| 5,055,148 | A | 10/1991 | Lindsay et al. |
| 5,104,476 | A | 4/1992 | Yamada et al. |
| 5,162,070 | A * | 11/1992 | Meyer .................. B29D 30/62 156/500 |
| 5,183,877 | A | 2/1993 | Swanson |
| 5,342,473 | A * | 8/1994 | Bibona ................ B29C 48/305 156/394.1 |
| 5,780,537 | A * | 7/1998 | Smith .................... C08K 5/548 524/493 |
| 5,807,918 | A | 9/1998 | Carter |
| 5,951,797 | A | 9/1999 | Majumdar et al. |
| 6,328,840 | B1 | 12/2001 | Takano et al. |
| 6,355,826 | B1 | 3/2002 | Parker |
| 6,397,910 | B1 | 6/2002 | Losey et al. |
| 6,407,165 | B1 * | 6/2002 | Wang ..................... C08K 5/01 152/525 |
| 6,455,165 | B1 | 9/2002 | Knaub et al. |
| 6,624,283 | B2 | 9/2003 | Viegas et al. |
| 6,808,579 | B1 | 10/2004 | Pulford et al. |
| 7,025,851 | B2 | 4/2006 | Caster et al. |
| 7,252,728 | B2 | 8/2007 | Weydert et al. |
| 7,294,678 | B2 | 11/2007 | McGlothlin et al. |
| 7,326,754 | B2 | 2/2008 | Nikolic et al. |
| 7,332,047 | B2 | 2/2008 | Majumdar et al. |
| 7,399,805 | B2 | 7/2008 | Mousty et al. |
| 8,367,165 | B2 | 2/2013 | Basile et al. |
| 8,980,433 | B2 | 3/2015 | Laubry |
| 9,573,423 | B2 | 2/2017 | Kimura |
| 9,868,836 | B2 | 1/2018 | Korwin-Edson et al. |
| 2002/0157761 | A1 * | 10/2002 | Bender .................. B29D 30/54 156/96 |
| 2003/0203992 | A1 * | 10/2003 | Mabry ..................... C08K 3/36 523/335 |
| 2003/0229153 | A1 | 12/2003 | Stollmaier et al. |
| 2004/0260007 | A1 | 12/2004 | Yamaguchi et al. |
| 2006/0118223 | A1 | 6/2006 | Maeda |
| 2010/0005117 | A1 | 1/2010 | Stut et al. |
| 2010/0139825 | A1 * | 6/2010 | Hetzel ..................... B60C 11/02 152/209.1 |
| 2012/0070678 | A1 | 3/2012 | Takahasi et al. |
| 2013/0087940 | A1 | 4/2013 | Young et al. |
| 2016/0264753 | A1 | 9/2016 | Salit et al. |

FOREIGN PATENT DOCUMENTS

| | | | |
|---|---|---|---|
| CN | 102358054 B | 6/2013 | |
| CN | 104044291 A | 9/2014 | |
| CN | 106239955 A | 12/2016 | |
| EP | 0316666 A1 | 5/1989 | |
| EP | 0285647 B1 | 1/1994 | |
| EP | 0941264 A1 * | 9/1999 | .......... C08L 2666/28 |
| EP | 1320566 B1 | 12/2005 | |
| EP | 2199110 B1 | 3/2013 | |
| EP | 2452833 A1 | 5/2014 | |
| EP | 2452833 B1 | 5/2014 | |
| GB | 746375 A | 3/1956 | |
| GB | 1449533 A | 9/1976 | |
| GB | 2039232 A | 10/1982 | |
| GB | 2234718 A * | 2/1991 | .......... B29D 30/56 |
| IN | 2842/DEL/2015 A | 12/2017 | |
| JP | S56106981 A | 8/1981 | |
| JP | 63159039 A | 7/1988 | |
| JP | 02296883 A * | 12/1990 | |
| JP | H02296883 A | 12/1990 | |
| JP | 2001288434 A | 10/2001 | |
| JP | 2005111780 A | 4/2005 | |
| JP | 2012224722 A * | 11/2012 | |
| JP | 2015083341 A | 4/2015 | |
| WO | 1997003034 A2 | 1/1997 | |
| WO | 1998023660 A1 | 6/1998 | |
| WO | 2002026858 A1 | 4/2002 | |
| WO | 2011096235 A1 | 8/2011 | |
| WO | 2015177104 A1 | 11/2015 | |
| WO | 2016196410 A1 | 12/2016 | |

OTHER PUBLICATIONS

ESpaceNet Translation of JP-02296883-A (Year: 2020).*
EPO translation of JP2012224722 (Year: 2021).*
Translation of IN2842/DEL/2015 (Year: 2021).*

* cited by examiner

METHODS FOR RETREADING TIRES

This application claims the benefit of U.S. Provisional Application Ser. No. 62/433,483 filed on Dec. 13, 2016, which is incorporated herein by reference.

FIELD OF THE INVENTION

Embodiments of the invention relate to methods for retreading a tire where the method employs the use of a cushion gum capable of ambient temperature curing.

BACKGROUND OF THE INVENTION

Retreaded tires have been available for many years and provide an economical way to gain additional use out of a tire casing after the original tread has become worn. Methods of retreading tires are used to extend the life of tires. By applying a new tread to a used tire casing, the life of the tire casing is extended. Retreaded tires often meet the same stringent quality standards as new tires and offer an economical and environmentally friendly alternative to new tires.

As is known in the art, the process generally begins with removal of the remaining tread from the tire casing. This can be accomplished by a buffing machine that grinds away the old tread and leaves a buffed surface that is generally smooth about the circumference of the tire casing. The tire casing may then be examined for injuries and repaired.

After completion of the repairs, the buffed surface can receive a new tread. In one process, the new tread, which is cured prior to applying the tread to the casing, is secured to the casing through a layer often referred to as a cushion gum or cushion gum layer. This cushion gum is an uncured rubber-containing composition that, upon curing, mates the new tread to the casing.

In some processes, the cushion gum is applied to the back, i.e., the inside surface, of a new tread. The cushion gum and tread can then be applied in combination about the circumference of the tire casing to create an uncured retreaded tire composite that is ready for curing. The uncured retreaded tire composite is then placed within a flexible rubber envelope and an airtight seal is created between the envelope and the beads of the tire. The entire enveloped tire assembly is placed within a curing chamber and subjected to pressure and heat in order to effect curing of the cushion gum.

Logistically, the tread is typically manufactured at a tread-making facility and shipped to a retreading facility where the new tread is applied to the casing. The cushion gum is likewise generally made a facility distinct from the retreading facility; e.g. it is prepared at a tread-making facility and shipped to the retreading facility.

In many processes, the cushion gum comprises a rubber component, a sulfur based cure system, reinforcing fillers, and other components when necessary. The cushion gum has a limited shelf life because of the presence of the sulfur based cure system; the uncured retread tire must be subjected to both heat and pressure in order to cure the cushion gum to the tread and the tire casing. Although limited, the shelf life of the cushion gum is relatively long because the sulfur-based cure systems require relatively high heat to be activated. Typically, the shelf life of the cushion gum is much shorter than the shelf life of the tread composite to which the cushion gum will eventually be secured. Furthermore, the cost of retreading a tire is affected by having to produce the cushion gum at a facility distinct from the retreading facility. The cost of retreading a tire is also affected by having to apply both heat and pressure to cure the cushion gum to the tread and the tire casing.

A desire therefore exists to improve upon the methods for retreading a tire, especially in regards to the preparation of the cushion gum and the treatment of the tire composite.

SUMMARY OF THE INVENTION

One or more embodiments of the present invention provide a process for retreading a tire, the process comprising the steps of providing a tire casing; providing a cured rubber component having first and second planar surfaces, where the first planar surface includes a tread pattern; providing a cushion gum, wherein the cushion gum is a composition including a functional polymer including at least one functional group, and a crosslinking agent including at least two moieties that will react with the functional group of the functional elastomer; applying the cushion gum to the tire casing; applying the second planar surface of the cured rubber to the cushion gum to form a tire composite; and treating the tire composite to thereby form a retread tire.

One or more embodiments of the present invention further provide a cushion gum comprising at least one functional elastomer, where the functional polymer includes at least one functional group that is reactive with an amine or an isocyanate; and at least one crosslinking agent selected from a diamine or a diisocyanate.

DETAILED DESCRIPTION OF ILLUSTRATIVE EMBODIMENTS

Embodiments of the present invention are based, at least in part, upon the discovery of a retreading process that employs a cushion gum capable of low temperature curing. According to aspects of the invention, the cushion gum is a composition that includes a functional polymer and a crosslinking agent that includes at least two groups or moieties that will react with the functional group of the functional polymer. In one or more embodiments, the crosslinking agent includes two or more isocyanate or amine groups (e.g. a diamine or diisocyanate). The reaction between the crosslinking agent and the functional group of the polymer, which reaction may take place at low temperatures, advantageously crosslinks the polymer. Practice of the invention thereby provides a unique method for retreading a tire where a cushion gum can be prepared at the same location in which the retreading takes place, and the crosslinking of the retreaded tire can take place at less extreme or even ambient temperatures.

Retreading Process

Except as provided herein, practice of one or more embodiments of the present invention is not necessarily limited by the retreading process used to ultimately produce a retread tire. Accordingly, processes generally known in the art may be used in the practice of this invention. In this regard, U.S. Pat. Nos. 3,335,041, 3,421,565, 3,342,238, 3,514,423, 4,463,120, 4,539,365, and 8,143,338, are incorporated herein by reference.

Figure 1:
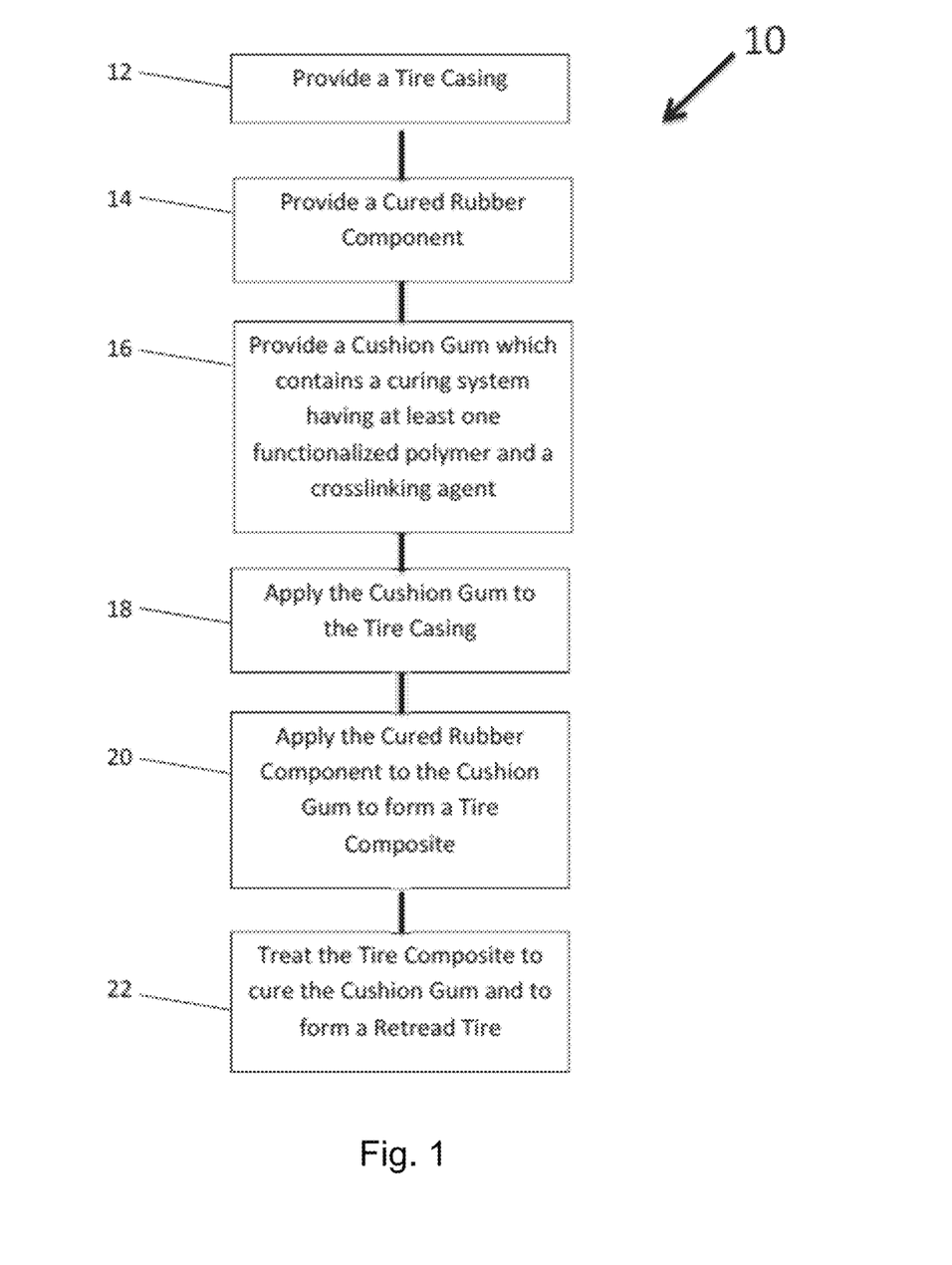
FIG. 1 is a flow chart showing the method of retreading a tire according to one or more embodiments of the invention.

An exemplary process can be described with reference to FIG. 1, where retreading process 10 includes step 12 of providing a tire casing; step 14 of providing a cured rubber component having a first and second planar surface, wherein the first planar surface includes a tread pattern; step 16 of providing a cushion gum according to aspects of this invention; step 18 of applying the cushion gum to the tire casing; step 20 of applying the second planar surface of the cured rubber component to the cushion gum to form a tire composite; and step 22 of treating the tire composite to cure the cushion gum and thereby form a retread tire.

Providing Tire Casing

Figure 2:
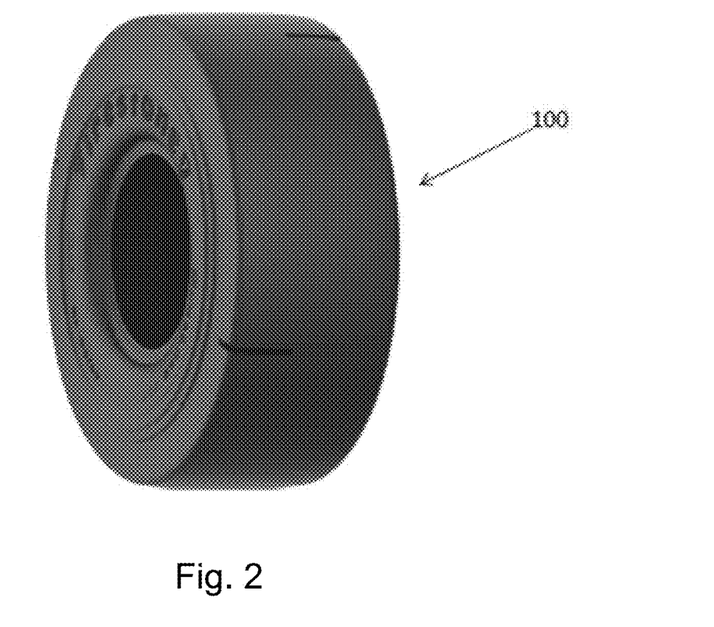
FIG. 2 is a perspective view of a tire casing according to one or more embodiments of the invention.

In one or more embodiments, step 12 of providing a tire casing includes collecting a tire that is in need of a new tread pattern. Step 12 of providing a tire casing may include preparing a tire casing with a buffed surface by buffing off the existing tread of the tire. After removal of the existing tread from the tire, the remaining portion may be referred to as a tire casing. An exemplary tire casing 100 is shown in FIG. 2.

In typical situations, step 12 of providing a tire casing 100 may include an inspection of the tire casing 100. This may include manual inspection, such as visual inspection and tactile inspection. In one or more embodiments, inspection can be performed using the assistance of equipment that can perform non-destructive testing. This equipment may include, for example, X-ray.

In one or more embodiments, cold process retreading is employed wherein a tire casing 100 is provided by removing tire tread from a tire using a buffing machine, such as those machines manufactured by Bridgestone Commercial Solutions. During the buffing operation, the original tire tread is ground away from tire casing 100, thereby leaving a tire casing 100 with a buffed surface. The buffed surface extends circumferentially about the tire casing 100 and also extends transversely across the outside of the outer radial wall until it terminates at the buffed shoulder areas.

In one or more embodiments, step 12 of providing a tire casing 100 may then include treating (e.g. spraying) the tire casing 100 with a cement in order to assist in the subsequent application of the cushion gum. Various cements may be employed and this invention is not limited to any particular cement treatment.

In one or more embodiments, following the removal of the used tread layer, the tire casing 100 may undergo repair. For example, the tire casing 100 may undergo skiving and filling. Skiving is the removal of damaged material from a tire casing prior to making a repair. Often, a tire casing accumulates cuts, holes, nicks, or tears due to stones or other sharp objects the tire comes in contact with during use. The injured or damaged area may be first ground smooth by an appropriate grinding tool and then filled with repair gum, which may be done using an extruder repair rope or repair gum or some other suitable material. It may be necessary to fill the injured areas to the level of buffed surface to avoid air pockets between the buffed surface and the later applied tread layer. Trapped air can have negative effects on the longevity of a typical retreaded tire.

In addition to skiving, which primarily addresses minor damage including non-penetrating injuries, the repair process may also include section repair wherein cables or other reinforcing elements of the tire casing 100 are repaired. Also, repair may be made to penetrating injuries such as may occur by using various plugs and patches to repair punctures in the tire casing 100.

In one or more embodiments, the tire casing 100 is allowed to equilibrate at ambient indoor temperature and humidity for a period of time, or in other embodiments from about 10 to 15 hours. In one or more embodiments, visible surface moisture on the tire casing 100 is removed, and holes or other damage to the tire casing 100 are repaired.

Providing a Cured Rubber Component

Figure 3:
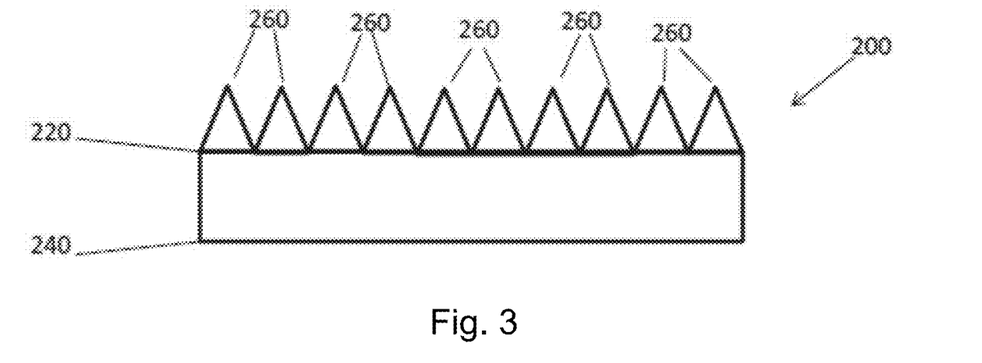
FIG. 3 is a sectional view of a cured rubber component according to one or more embodiments of the invention.

In one or more embodiments, step 14 of providing a cured rubber component includes providing a cured rubber component having first and second planar surfaces, wherein the first planar surface includes a tread pattern. FIG. 3 shows a cured rubber component 200, which may also be referred to as tread 200. The cured rubber component 200 contains a first planar surface 220 and a second planar surface 240. The first planar surface includes a tread pattern 260 and in some embodiments, the second planar surface 240 is a smooth surface. In one or more embodiments, practice of the present invention is not necessarily limited by the selection of the cured rubber component 200, which may also be referred to as a pre-cured profiled tread strip or a tread substrate. Accordingly, the step of providing a cured rubber component 200 may rely on known techniques of the prior art, especially the known art relating to treads adapted for use in retreading operations. As is known in the art, the cured rubber component 200 may advantageously include a tread pattern 260 having varying topographies and/or designs. In one or more embodiments, the cured rubber component 200 may be formed by methods known to those skilled in the art including, but not limited to, curing with a flat molding press. Cured rubber components useful in practice of the present invention include those described in U.S. Pat. Nos. 3,951,720, 4,075,047, 4,046,947, and 8,298,463, as well as EP 0989171, which are incorporated herein by reference.

As generally known in the art, the cured rubber component 200 will have a first planar surface 220 opposite a second planar surface 240. The first planar surface 220 may be integral with the second planar surface 240 to the extent that both derive from the same extrudate, or in other embodiments the second planar surface 240 may derive from one or more additional rubber layers mated to the first planar surface 220. In one or more embodiments, the first planar surface 220 includes a tread portion 260.

In one or more embodiments, the cured rubber component 220 may be formed from rubber compounds including a variety of crosslinkable rubbers such as, but not limited to, natural rubber, synthetic polyisoprene, polybutadiene, butadiene-isoprene copolymers, rubbery copolymers of butadiene and styrene, rubbery copolymers of butadiene and acrylonitrile, rubbery copolymers of isoprene and isobutylene, polychloroprene, ethylene-propylene rubbers, and the like.

As is known in the art, these cured rubber components may include reinforcing and non-reinforcing fillers. Exemplary fillers include carbon black, silica, and sundry inorganic fillers.

Useful carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 m²/g and in other embodiments at least 35 m²/g; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

Examples of suitable silica filler include precipitated amorphous silica, wet silica (hydrated silicic acid), dry silica (anhydrous silicic acid), fumed silica, calcium silicate, aluminum silicate, magnesium silicate, and the like.

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 m²/g. Useful ranges of surface area include from about 32 to about 400 m²/g, about 100 to about 250 m²/g, and about 150 to about 220 m²/g.

Where silica is employed, the pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano) tetrasulfides.

Other useful filler materials include sundry inorganic and organic fillers. Examples of organic fillers include starch. Examples of inorganic fillers include silica, aluminum hydroxide, magnesium hydroxide, mica, talc (hydrated magnesium silicate), and clays (hydrated aluminum silicates).

The skilled person also appreciates that the cured rubber component can be cured by using a multitude of rubber curing agents (also called vulcanizing agents), including sulfur or peroxide-based curing systems. Curing agents are described in Kirk-Othmer, ENCYCLOPEDIA OF CHEMICAL TECHNOLOGY, Vol. 20, pgs. 365-468, (3rd Ed. 1982), particularly *Vulcanization Agents and Auxiliary Materials*, pgs. 390-402, and A. Y. Coran, Vulcanization, ENCYCLOPEDIA OF POLYMER SCIENCE AND ENGINEERING, (2nd Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like. The skilled person will be able to readily select the amount of cure accelerators to achieve the level of desired cure.

In one or more embodiments, the cured rubber components may include other ingredients that are typically employed in rubber compounding. These include accelerators, accelerator activators, oils, additional plasticizers, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

In one or more embodiments, the cured rubber composition may be prepared by first preparing a vulcanizable composition, and then processing the composition into a desired shape (e.g. a tread shape) using ordinary tire manufacturing techniques including standard rubber shaping and molding. The green component can then be cured using standard curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Useful techniques are disclosed in U.S. Pat. Nos. 5,866,171, 5,876,527, 5,931,211, and 5,971,046, which are incorporated herein by reference.

Providing a Cushion Gum

In one or more embodiments, step 16 of providing a cushion gum, which may also be referred to as a cushion gum composition, includes providing a crosslinkable composition and shaping the composition into a desired shape.

Crosslinkable Composition

As suggested above, the crosslinkable composition includes a functional polymer and a crosslinking agent. Additionally, the crosslinkable composition may include other constituents, such as oils, fillers, and catalysts.

Crosslinking Agent

In one or more embodiments, the crosslinking agent includes at least two groups or moieties that will react with the functional groups of the functional elastomer. In one or more embodiments, the functional groups may include isocyanate groups, amine groups, acid anhydride groups, and hydroxyl groups. In one or more embodiments, the functional groups may be the same, and in other embodiments, the functional groups may be different.

In one or more embodiments, the crosslinking agent is a multi-isocyanate defined by the formula R—(NCO)x, wherein R represents an organic group and x is an integer of at least 2. In one or more embodiments, x is an integer up to 20, in other embodiments up to 10, and in other embodiments up to 5. In one or more embodiments, the organic group R is an aliphatic hydrocarbon group having from 2 to 20 carbon atoms, a cycloaliphatic hydrocarbon group having from 4 to 20 carbon atoms, an aromatic hydrocarbon group having from 6 to 20 carbon atoms, or a heterocyclic group (e.g., N-heterocyclic ring) having from 4 to 20 carbon atoms. In other embodiments, R is an organic macromolecule such as a polymer or oligomer. These polymers or ligomers may include polyolefins, polydiolefins (e.g. polydienes), polyimines, polyisocyanates, polyethers, and polyesters. In one or more embodiments, R is a polymer or oligomer having a molecular weight of at least 250, in other embodiments at least 1,000, and in other embodiments at least 10,000 g/mole. In these or other embodiments, R is a polymer or oligomer having a molecular weight of from about 250 to about 250,000, in other embodiments from about 1,000 to about 125,000, and in other embodiments from about 10,000 to about 80,000 g/mole.

In particular embodiments, the crosslinking agent is a diisocyanate. Specific examples of useful diisocyanates include ethylene diisocyanate; propylene-1,2-diisocyanate; tetramethylene diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophoronediisocyanate; 4,4'-dicyclohexylmethane diisocyanate; 2,4-hexahydrotoluene diisocyanate; 2,6-hexahydrotoluene diisocyanate and 2,4-siisocyanato-1-methyl-benzene. In other embodiments, the crosslinking agent is a triisocyanate. Specific examples of useful triisocyanates include triisocyanate of HDI; triisocyanate of 2,2,4-trimethyl-1,6-hexane diisocyanate. In one or more embodiments, the crosslinking agent includes a mixture of diisocyanates and triisocyanates. In particular embodiments, the crosslinking agent is polyisocyanate prepolymer.

In one or more embodiments, the crosslinking agent is a multi-amine defined by the formula R—(NH2)x, wherein R represents an organic group and x is an integer of at least 2. In one or more embodiments, x is an integer up to 20, in other embodiments up to 10, and in other embodiments up to 5. In one or more embodiments, the organic group R is an aliphatic hydrocarbon group having from 2 to 20 carbon atoms, a cycloaliphatic hydrocarbon group having from 4 to 20 carbon atoms, an aromatic hydrocarbon group having from 6 to 20 carbon atoms, or a heterocyclic group (e.g., N-heterocyclic ring) having from 4 to 20 carbon atoms. In other embodiments, R is an organic macromolecule such as a polymer or oligomer. These polymers or ligomers may include polyolefins, polydiolefins (e.g. polydienes), polyimines, polyisocyanates, polyethers, and polyesters. In one or more embodiments, R is a polymer or oligomer having a molecular weight of at least 250, in other embodiments at least 1,000, and in other embodiments at least 10,000 g/mole. In these or other embodiments, R is a polymer or oligomer having a molecular weight of from about 250 to about 250,000, in other embodiments from about 1,000 to about 125,000, and in other embodiments from about 10,000 to about 80,000 g/mole.

In particular embodiments, the crosslinking agent is a diamine. Specific examples of useful diamines include ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diaminodicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-C1-C6-dianiline such as 4,4'-methylenedianiline; aniline-formaldehyde resin/, trimethylene glycol di-p-aminobenzoate; bis-(2-aminoethyl)-amine, bis-(3-aminopropyl)-amine, bis-(4-aminobutyl)-amine; and bis-(6-aminohexyl)-amine. Specific examples of useful triamines include isomeric mixtures of dipropylene triamine and dibutylene triamine. In particular embodiments, the crosslinking agent is a polyetheramine.

In one or more embodiments, the crosslinking agent is a multi-hydroxyl defined by the formula R—(OH2)x, wherein R represents an organic group and x is an integer of at least 2. In one or more embodiments, x is an integer up to 20, in other embodiments up to 10, and in other embodiments up to 5. In one or more embodiments, the organic group R is an aliphatic hydrocarbon group having from 2 to 20 carbon atoms, a cycloaliphatic hydrocarbon group having from 4 to 20 carbon atoms, an aromatic hydrocarbon group having from 6 to 20 carbon atoms, or a heterocyclic group (e.g., N-heterocyclic ring) having from 4 to 20 carbon atoms. In other embodiments, R is an organic macromolecule such as a polymer or oligomer. These polymers or ligomers may include polyolefins, polydiolefins (e.g. polydienes), polyimines, polyisocyanates, polyethers, and polyesters. In one or more embodiments, R is a polymer or oligomer having a molecular weight of at least 250, in other embodiments at least 1,000, and in other embodiments at least 10,000 g/mole. In these or other embodiments, R is a polymer or oligomer having a molecular weight of from about 250 to about 250,000, in other embodiments from about 1,000 to about 125,000, and in other embodiments from about 10,000 to about 80,000 g/mole.

In particular embodiments, the crosslinking agent is a glycol. Specific examples of useful glycols include ethylene glycol; trimethylene glycol, 1,2- and 1,3-propylene glycol; tetramethylene glycol; hexamethylene glycol; polyethylene glycol, polypropylene glycol, polyethylene oxide, polypropylene oxide, and hydroxyl terminated polydienes such as dihydroxyl polybutadiene.

Functional Polymer

In one or more embodiments, the functional polymer may include one or more functional groups, which may be referred to as functionalities, located at one or more of the terminal ends of the polymer. In these or other embodiments, the functional polymer may include one or more functional groups located along the backbone of the polymer. In particular embodiments, the functional polymer includes multiple functionalities.

As suggested above, in one or more embodiments, the functional groups of the functional polymer include those groups that will react with the crosslinking agent. In one more embodiments, these functional groups include those groups that will react with an isocyanate (i.e. isocyanate-reactive groups). In other embodiments, these functional groups include those groups that will react with an amine (i.e. amine-reactive groups). In other embodiments, these functional groups include those groups that will react with a hydroxyl group (i.e. hydroxyl-reactive groups). In other embodiments, these functional groups include those groups that will react with an acid anhydride group (i.e. acid anhydride-reactive groups).

As is known in the art, hydroxyl groups, amine groups, and organic acid anhydride groups will react with isocyanates. Likewise, hydroxyl groups and organic acid anhydride groups will react with amines. Accordingly, in one or more embodiments, the functional groups include hydroxyl groups. In other embodiments, the functional groups include organic acid anhydride groups. In yet other embodiments, the functional groups include both organic acid anhydride groups and hydroxyl groups. Exemplary organic acid anhydride groups include those that derive from a modifying reaction wherein the an elastomer is reacted with and modified by a an organic acid anhydride such as, but not limited to, unsaturated diacid anhydrides such as maleic anhydride, citraconic anhydride, itaconic anhydride, glutaconic anhydride, crotonic anhydride, 3,4,5,6-tetrahydrophthalic anhydride, 2,3-dimethylmaleic anhydride, bromomaleic anhydride, chloromaleic anhydride, dibromomaleic anhydride, and dichloromaleic anhydride. For purposes of this specification, reference may be made to hydroxyl-bearing polymers to reference those elastomers that include a hydroxyl functional group, and anhydride-bearing polymers to reference those elastomers that include an organic acid anhydride functional group.

In one or more embodiments, the hydroxyl-bearing polymer includes at least 0.05 weight percent, in other embodiments at least 0.5 weight percent, in other embodiments at least 1 weight percent, and in other embodiments at least 3 weight percent hydroxyl functionality (i.e., weight of the hydroxyl functionalities) based on the entire weight of the polymer. In these or other embodiments, the hydroxyl-bearing polymer includes at most 15 weight percent, in other embodiments at most 7 weight percent, and in other embodiments at most 5 weight percent hydroxyl functionality based on the entire weight of the polymer. In one or more embodiments, the hydroxyl-bearing polymer includes from about 0.05 to about 15 weight percent, in other embodiments from about 0.5 to about 7 weight percent, and in other embodiments from about 1 to about 5 weight percent hydroxyl functionality based on the entire weight of the polymer.

In one or more embodiments, the anhydride-bearing polymer includes at least 0.05 weight percent, in other embodiments at least 0.5 weight percent, in other embodiments at least 1 weight percent, and in other embodiments at least 3 weight percent hydroxyl functionality (i.e., weight of the hydroxyl functionalities) based on the entire weight of the polymer. In these or other embodiments, the anhydride-bearing polymer includes at most 15 weight percent, in other embodiments at most 7 weight percent, and in other embodiments at most 5 weight percent hydroxyl functionality based on the entire weight of the polymer. In one or more embodiments, the anhydride-bearing polymer includes from about 0.05 to about 15 weight percent, in other embodiments from about 0.5 to about 7 weight percent, and in other embodiments from about 1 to about 5 weight percent hydroxyl functionality based on the entire weight of the polymer.

Specific examples of functional polymer include hydroxyl-terminated polydienes and hydroxyl-terminated polydiene copolymers, carboxylated polydienes and carboxylated polydiene copolymers, maleated polydienes and maleated polydiene copolymers, polyisocyanates, and polyether amines.

Without wishing to be bound by any particular theory, it is believed that the functional polymer entangles within the composition. Thus, in one or more embodiments, the functional polymer has sufficient molecular weight (which molecular weight yields sufficient length) to entangle. In one or more embodiments, the functional polymer has a length that is at least 1 times the entanglement length of the polymer, in other embodiments at least 1.2 times the entanglement length of the polymer, in other embodiments at least 1.5 times the entanglement length of the polymer, and in other embodiments at least 2 times the entanglement length of the polymer.

In one or more embodiments, the functional polymer has a number average molecular weight of at least 50 kg/mole, in other embodiments at least 75 kg/mole, and in other embodiments at least 100 kg/mole. In these or other embodiments, the functional polymer as a number average molecular weight of at most 500 kg/mole, in other embodiments at most 300 kg/mole, and in other embodiments at most 200 kg/mole. In one or more embodiments, the functional polymer has a number average molecular weight of from about 50 kg/mole to about 500, in other embodiments from about 75 to about 300 kg/mole, and in other embodiments from about 100 to about 250 kg/mole.

In one or more embodiments, the backbone of the functional polymer is characterized by having a glass transition temperature ($T_g$) of less than 20° C., in other embodiments less than 0° C., and in other embodiments less than −20° C.

In one or more embodiments, the backbone of the functional polymer is a synthetic polydiene or a polydiene copolymer. Useful dienes that may be used in the synthesis of polydienes or polydienes copolymers include, but are not limited to, conjugated dienes such as 1,3-butadiene and isoprene. Useful monomer that may copolymerized with copolymerized with conjugated dienes include, for example, vinyl aromatic monomer such styrene.

In one or more embodiments, the backbone of the functional elastomer may be a polybutadiene, polyisoprene, poly(butadiene-co-isoprene), poly(styrene-co-butadiene), poly(styrene-co-isoprene-co-butadiene), and poly(styrene-co-isoprene).

In yet other embodiments, the backbone of the functional polymer may include olefinic elastomers such as those deriving from the polymerization ethylene together with comonomer. Exemplary olefinic elastomers include poly(ethylene-co-propylene-co-diene) and poly(ethylene-co-propylene), and poly(propylene-co-ethylene).

Filler

As suggested above, the crosslinkable composition may include a filler. The filler may include one or more conventional reinforcing or non-reinforcing fillers. For example, useful fillers include carbon black, silica, alumina, and silicates such as calcium, aluminum, and magnesium silicates.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In particular embodiments, the carbon blacks may have a surface area (EMSA) of at least 20 $m^2/g$, in other embodiments at least 35 $m^2/g$, in other embodiments at least 50 $m^2/g$, in other embodiments at least 60 $m^2/g$; surface area values can be determined by ASTM D-1765 using the cetyltrimethylammonium bromide (CTAB) technique. In particular embodiments, the sidewalls include carbon black filler having a surface area (EMSA) of from about 60 to about 110 $m^2/g$. The carbon blacks may be in a pelletized form or an unpelletized flocculent form. The preferred form of carbon black may depend upon the type of mixing equipment used to mix the rubber compound.

In one or more embodiments, the filler may include silica. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas that may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

In one or more embodiments, the crosslinkable composition employed to prepare the cushion of this invention may include, in addition to the functional elastomer, an elastomer that is not a functional elastomer. The functional elastomer and the non-functional elastomer combine to form the rubber component of the crosslinkable composition.

In one or more embodiments, these non-functional elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers. Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

Crosslinking Catalysts

In one or more embodiments the crosslinkable compositions include a catalyst for facilitating the crosslinking reaction. Catalysts, that may be employed include those that initiate the polymerization reaction between the isocyanate and the polyol, as well as a trimerization reaction between free isocyanate groups. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris [(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Other Ingredients

Other ingredients that are typically employed in rubber compounding may also be added to the crosslinkable compositions employed to prepare the cushion gum according to this invention. These include oils, plasticizer, waxes, scorch inhibiting agents, processing aids, zinc oxide, tackifying resins, reinforcing resins, fatty acids such as stearic acid, and peptizers. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Ingredient Amounts

In one or more embodiments, the crosslinkable compositions include at least 20, in other embodiments at least 30, and in other embodiments at least 40 percent by weight of the rubber component, based upon the entire weight of the composition. In these or other embodiments, the crosslinkable compositions include at most 90, in other embodiments at most 70, and in other embodiments at most 60 percent by weight of the rubber component based on the entire weight of the composition. In one or more embodiments, the crosslinkable compositions include from about 20 to about 90, in other embodiments from about 30 to about 70, and in other embodiments from about 40 to about 60 percent by weight of the rubber component based upon the entire weight of the composition.

As suggested above, in certain embodiments of the invention, the rubber component includes (an in certain embodiments consists of) functional elastomer and optionally non-functional elastomer. In one or more of these embodiments, the weight ratio of functional elastomer to non-functional elastomer may be from 1:0 to 1:1, in other embodiments from 1:0.1 to 1:0.9, and in other embodiments from 1:0.2 to 1:0.8.

In one or more embodiments, the amount of crosslinking agent included within the crosslinking composition may defined based upon the equivalents of reactive moieties within the crosslinking agent (e.g. equivalents of isocyanate or amine) and the equivalents of functional groups on the functional elastomer. In one or more embodiments, at least 0.5, in other embodiments at least 1, in other embodiments at least 2, in other embodiments at least 3, and in other embodiments at least 5 equivalents of reactive moiety associated with the crosslinking agent is present per equivalent of functional group associated with the polymer.

In one or more embodiments, the amount of crosslinking agent included within the crosslinkable composition may be represented based upon the weight of crosslinking agent relative to the weight of the functional elastomer. In one or more embodiments, the crosslinkable composition includes at least 5, in other embodiments at least 25, and in other embodiments at least 40 parts by weight (pbw) crosslinking agent per 100 parts by weight rubber (phr). In these or other embodiments, the crosslinkable composition includes at most 200, in other embodiments at most 120, and in other embodiments at most 70 pbw of the crosslinking agent phr. In one or more embodiments, the crosslinkable composition includes from about 5 to about 200, in other embodiments from about 25 to about 120, and in other embodiments from about 40 to about 70 pbw of crosslinking agent phr.

In yet other embodiments, the amount of amount of crosslinking agent included within the crosslinkable composition may be represented based upon the open time that the crosslinkable composition provides. As the skilled person will appreciate, open time refers to that amount of time that the composition is processable. As the functional elastomer crosslinks, the composition becomes less processable until it becomes appreciably non-processable. In one or more embodiments, the amount of crosslinking agent employed provides an open time of at least 1 minute, in other embodiments at least 5 minutes, in other embodiments at least 10 minutes and in other embodiments at least 20 minutes, in other embodiments at least 40 minutes, in other embodiments at least 80 minutes, and in other embodiments at least 160 minutes. In one or more embodiments, the amount of crosslinking agent present within the crosslinkable composition is sufficient to provide an open time of from about 1 to about 200 minutes, in other embodiments from about 5 to about 100 minutes, and in other embodiments from about 10 to about 60 minutes.

In one or more embodiments, the crosslinkable compositions include at least 5, in other embodiments at least 25, and in other embodiments at least 40 parts by weight (pbw) filler (e.g. carbon black) per 100 parts by weight rubber (phr). In these or other embodiments, the crosslinkable composition includes at most 200, in other embodiments at most 120, and in other embodiments at most 70 pbw of the filler phr. In one or more embodiments, the crosslinkable composition includes from about 5 to about 200, in other embodiments from about 25 to about 120, and in other embodiments from about 40 to about 70 pbw of filler phr.

Manufacturing the Cushion Gum

In one or more embodiments, step 16 of providing a cushion gum includes the step of manufacturing the cushion gum. The manufacturing process for the cushion may generally include mixing the functional elastomer, crosslinking agent, and optional ingredients. This step of mixing may employ conventional mixing equipment such as batch and continuous mixing equipment. For example, batch mixing equipment may include equipment such as Banbury or Brabender mixers, and two-rolled mills. Continuous mixing equipment may include extruders, such as single screw, twin screw, planetary extruders, as well as kneaders.

In one or more embodiments, regardless of what process is used to manufacture the cushion gum, the process to prepare the cushion gum may advantageously take place at the same location in which the process for retreading the tire takes place.

Figure 4:
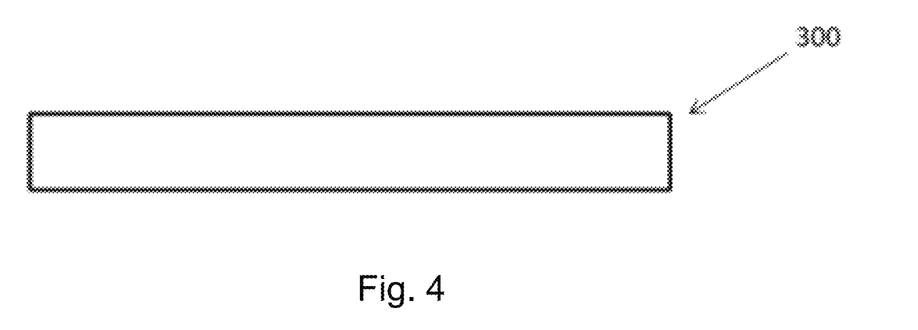
FIG. 4 is a sectional view of a cushion gum according to one or more embodiments of the invention.

In one embodiment, the cushion gum is manufactured by extrusion. For example, the cushion gum composition may be extruded through an extruder to form a cushion gum extrudate. The cushion gum extrudate is then applied to the tire casing. In another embodiment, the cushion gum is extruded and applied directly on to the tire casing. In yet other embodiments, the cushion gum may be prepared by rubber calendaring techniques. FIG. 4. Shows an exemplary cushion gum extrudate 300.

Applying the Cushion Gum to the Tire Casing

In one or more embodiments, step 18 includes applying the cushion gum 300 to the tire casing 100. In one or more embodiments, the cushion gum 300 is applied to the tire casing 100 using a building machine, such as those available from Bridgestone Commercial Solutions.

In one or more embodiments, wherein the cushion gum 300 is applied in the form of a calendared sheet or extrudate, the cushion gum 300 and the cured rubber component 200 can be applied at the same machine, as described later. Although the layer of cushion gum 300 can be applied to the tire casing 100 in a variety of ways, in one embodiment, a roll of the cushion gum 300 is rotatably mounted on a building machine and the layer of the cushion gum 300 moves about a tensioning roller prior to being wrapped circumferentially around the buffed surface of the tire casing 100. In one or more embodiments, the cushion gum may be prepared by extrusion and applied directly to the casing.

In these or other embodiments, the step of applying a cushion gum to the casing further may include applying a layer of unheated cushion gum directly to the buffed surface under tension to stretch the layer of unheated cushion gum to facilitate conformation to the buffed surface and thereafter stitching the layer of unheated cushion gum with sufficient pressure to force air from between the casing and the layer of cushion gum.

In certain embodiments, the cushion gum 300 is covered by a protective film, for example a bottom plastic sheet, e.g.

a poly sheet, and a similar top plastic sheet. The bottom sheet may be peeled away from the cushion gum 300 shortly before the cushion gum 300 is wrapped about the tire casing 100 along the buffed surface. The bottom plastic sheet may then be wrapped about a tensioning roller.

The cushion gum 300 may be applied to the buffed surface of the tire casing 100 within eight hours of buffing. Additionally, the cushion gum 300 may be applied under tension in the circumferential direction. Depending on the application, it may be desirable to slightly stretch the cushion gum 300 to achieve better adherence to the buffed surface of the tire casing 100. Typically, the cushion gum 300 is cut transversely, and the cut edge is spliced with the leading edge so there is no gap between the beginning and the end of cushion gum 300.

In one or more embodiments, the cushion gum 300 may be applied to the tire casing 100 and trimmed to size. The resulting "cushioned" tire casing is then paired with the cured rubber component 200 and subjected to a treatment, as described later.

In certain embodiments, after the cushion gum 300 is applied to the tire casing 100, a layer is stitched, or in other words pressed, against the buffed surface of the tire casing 100 to drive out any air trapped between the cushion gum 300 and buffed surface of the casing 100. Following stitching, if a top layer of plastic is present over the cushion gum 300, the top layer of plastic is removed from the cushion gum 300 to permit a cured rubber component 200 to later be applied over the cushion gum 300.

In certain embodiments, a primer is laid down about the tire casing 100 prior to the cushion gum 300 being wrapped around said tire casing 100. In yet other embodiments, the cured rubber component 200 contains a reactive polymer so as to allow the cured rubber component to better adhere to the cushion gum 300.

Applying a Cured Rubber Component to the Cushion Gum to Form a Tire Composite

In one or more embodiments, step 20 includes applying a cured rubber component 200 to the cushion gum 300 to form a tire composite. In one or more embodiments, both the cured rubber component 200 and optionally the cushion gum 300 are applied using the same building machine. In one or more embodiments, said step of treating the tire composite to cure the cushion gum further may include encasing the tire composite in an envelope.

Figure 5:
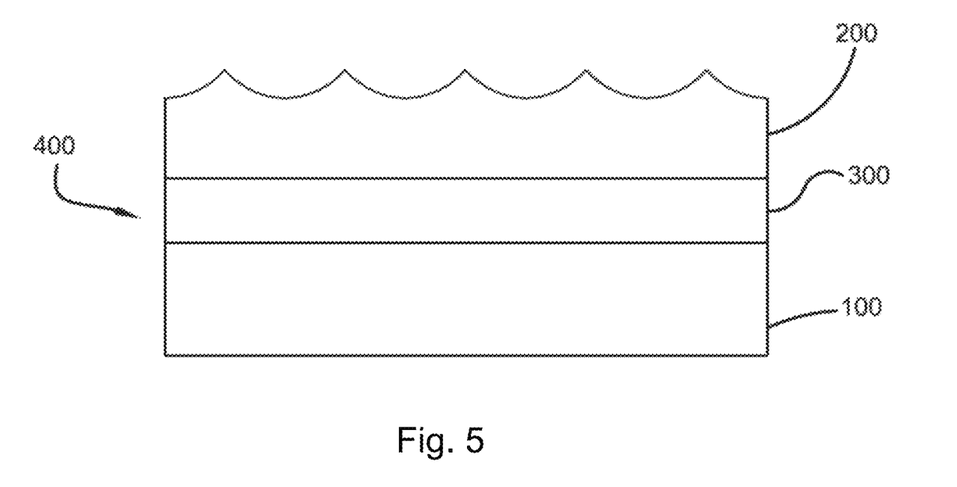
FIG. 5 is a sectional view of a retreaded tire composite according to embodiments of the invention.

In one or more embodiments, step 20 includes applying the second planar surface 240 of the cured rubber component 200 against the exposed portion of the cushion gum 300. By applying the second planar surface 240 of the cured rubber component 200 against the exposed portion of the cushion gum 300, it places the first planar surface 220 including the tread pattern 260 on the outside of the tire composite. As shown in FIG. 5, the resulting composite 400 includes casing 100, cushion gum 300 disposed on casing 100, and tread 200 disposed on cushion gum 300.

In one or more embodiments, the cured rubber component 200 is also applied with the assistance of a building machine that differs from the building machine used to apply the cushion gum 300. When using a building machine, the cured rubber component 200 may be guided onto the tire casing 100 against the cushion gum 300 by guide rollers.

The tire casing 100 is rotated on the building machine until a sufficient length of the cured rubber component 200 is unraveled from a cured rubber component roll to extend about the circumference of the tire casing 100. If a release liner is used over the cushion gum, it would be removed prior to this step. The cured rubber component 200 is then cut generally transversely to the circumferential direction, and the cut end is butted up against the leading edge of the cured rubber component 200 to form a splice. The cured rubber component splice is often held together by a plurality of staples. In one or more embodiments, a spliced area of cushion gum 300 and a spliced area of the cured rubber component 200 may be disposed at different points along buffed surface of the tire casing 100. Once both the cushion gum 300 and the cured rubber component 200 are applied on the tire casing 100, a tire composite is formed.

Treating the Tire Composite to Form a Retread Tire

In one or more embodiments, step 22 includes treating the tire composite to cure the cushion gum 300 and to form a retread tire.

In one or more embodiments, after application of the cushion gum 300 and the cured rubber component 200 to the tire casing 100, a tire composite is formed and is ready for treatment under appropriate temperature and pressure conditions. In one or more embodiments, step 22 of treating the tire composite includes placing the tire composite into a rubberized curing envelope designed for the particular tire type and size being retreaded. The envelope is sealed to the beads of the tire casing. The rubberized curing envelope is then subjected to pressure (or vacuum as the case may be) so as to ensure that the tread conforms to the compound outer curvature of the casing. In one or more embodiments, the pressure applied is about 80 PSI to about 100 PSI relative to atmospheric, for example 85 to 90 PSI.

In one or more embodiments, step 22 of treating the tire composite takes places at an ambient operating temperature. In one or more embodiments, the operating temperature is below 110° C., in other embodiments below 100° C., and in other embodiments below 60° C. In these or other embodiments, the operating temperature is from about 15° C. to about 100° C., and in other embodiments from about 18° C. to about 60° C.

The time required or desired to treat the tire composite will depend on the treatment conditions. After the treatment is complete, the pressure on the curing envelope is returned to atmospheric, and a fully functional retread tire is formed.

Various modifications and alterations that do not depart from the scope and spirit of this invention will become apparent to those skilled in the art. This invention is not to be duly limited to the illustrative embodiments set forth herein.

What is claimed is:

1. A process for retreading a tire, the process comprising the steps of:
   (i) providing a tire casing;
   (ii) providing a cured rubber component having first and second planar surfaces, where the first planar surface includes a tread pattern;
   (iii) mixing a functional polymer including at least one functional group, a crosslinking agent, and a carbon black filler to form an extrudable cushion gum mixture, wherein the functional polymer including at least one functional group has a number average molecular weight of from 50 kg/mole to 500 kg/mole and wherein the at least one functional group is a hydroxyl or organic acid anhydride group, and wherein the crosslinking agent is a multi-isocyanate or a multi-amine that will react with the functional group of the functional polymer;
   (iv) extruding the extrudable cushion gum mixture directly on the tire casing to form an extruded cushion gum;

(v) applying the second planar surface of the cured rubber to the extruded cushion gum to form a tire composite; and (vi) treating the tire composite to thereby form a retread tire, where said step of treating the tire composite takes place at a temperature of below 110° C.

2. The process of claim 1, where the multi-isocyanate is a diisocyanate.

3. The process of claim 1, where the multi-amine is a diamine.

4. The process of claim 1, wherein said step of mixing occurs at the same location in which the process for retreading a tire takes place.

5. The process of claim 1, wherein said step of providing a tire casing further comprises preparing a tire casing with a buffed surface by buffing off the existing tread of the tire casing.

6. The process of claim 1, wherein said step of treating the tire composite to thereby form a retread tire comprises encasing the tread composite in an envelope; placing the enveloped tire composite in a pressure chamber; and applying pressure to the enveloped tire composite to form a retread tire.

7. The process of claim 1, wherein said step of treating the tire composite takes place at a temperature of below 60° C.

8. The process of claim 1, wherein said step of treating the tire composite takes place at a temperature of from 18° C. to 60° C.

9. The process of claim 1, where said step of treating takes place at a temperature of below 100° C.

10. The process of claim 9, wherein said step of treating the tire composite to thereby form a retread tire comprises encasing the tread composite in an envelope; placing the enveloped tire composite in a pressure chamber; and applying pressure to the enveloped tire composite to form a retread tire.

11. The process of claim 10, wherein said step of treating the tire composite takes place at a temperature of below 60° C.

\* \* \* \* \*